US012503348B1

(12) United States Patent
Sheldon

(10) Patent No.: US 12,503,348 B1
(45) Date of Patent: Dec. 23, 2025

(54) EQUIPOTENTIAL SAFETY DEVICE

(71) Applicant: Paul Sheldon, Niagara, WI (US)

(72) Inventor: Paul Sheldon, Niagara, WI (US)

( * ) Notice: Subject to any disclaimer, the term of this patent is extended or adjusted under 35 U.S.C. 154(b) by 1114 days.

(21) Appl. No.: 17/495,023

(22) Filed: Oct. 6, 2021

(51) Int. Cl.
*B66F 11/04* (2006.01)
*B66C 15/06* (2006.01)
*B66F 17/00* (2006.01)
*F16M 13/02* (2006.01)

(52) U.S. Cl.
CPC .......... *B66F 11/044* (2013.01); *B66C 15/065* (2013.01); *B66F 17/006* (2013.01); *F16M 13/02* (2013.01)

(58) Field of Classification Search
CPC ..... B66F 11/044; B66F 17/006; B66C 15/065
See application file for complete search history.

(56) References Cited

U.S. PATENT DOCUMENTS 3,121,825 A * 2/1964 Abegg .................... H05F 3/025 361/216
3,139,948 A * 7/1964 Rorden ................. B66F 11/044 182/2.4
3,642,096 A * 2/1972 Valentine .............. B66F 11/044 182/2.11
4,534,444 A 8/1985 Smith
5,296,844 A * 3/1994 Hanrahan .............. G01R 29/12 340/657
6,170,607 B1 1/2001 Freeman et al.
6,379,023 B1 4/2002 Passno
6,470,999 B1 10/2002 Schanzle
7,645,962 B2 * 1/2010 Krossa .................... H05F 3/025 219/541
8,550,211 B2 10/2013 Higgins et al.
9,776,845 B2 10/2017 Minke
9,972,942 B1 * 5/2018 Bordelon ................ E01C 5/005
10,181,681 B1 * 1/2019 Klein ................... H01R 13/648
10,974,939 B2 * 4/2021 Bilic ..................... B66F 17/006
2016/0280525 A1 9/2016 Higgins

FOREIGN PATENT DOCUMENTS

WO WO-2010011125 A2 * 1/2010 ............. A47G 27/02

* cited by examiner

*Primary Examiner* — Adriana Figueroa
(74) *Attorney, Agent, or Firm* — Cramer Patent & Design, PLLC.; Aaron R. Cramer

(57) ABSTRACT

An equipotential safety device comprises a metallic grate sized and configured to be set upon the floor of a bucket of a bucket truck. The grate is in electrical communication with an electrical grounding source.

2 Claims, 5 Drawing Sheets

EQUIPOTENTIAL SAFETY DEVICE

RELATED APPLICATIONS

Non-applicable.

FIELD OF THE INVENTION

The present invention relates generally to an equipotential safety device for electrical workers or linemen.

BACKGROUND OF THE INVENTION

Electrical linemen commonly find themselves working on live overhead lines. These linemen rely on personal protective equipment (PPE) such as insulated suits (EPZ hot suits), hot sticks, and multiple classes of thick Rubber gloves for protection against high voltages distribution lines and or transmission circuits.

Unfortunately, all of this PPE makes the work process take longer and increases the chance of heat related stress in hot weather. But perhaps most importantly, since the work takes longer, the lineman is now exposed to danger over a longer period of time, which ultimately results in more incidents and accidents. When available and necessary means are met to take an outage on specific circuits to perform the work more proficiently, safely, and accordingly to time sensitive schedules, there exists a need for a means of a safer approach to working on these de-energized circuits by which electrical linemen can work on de-energized lines without the impediment of current methods a bucket insulated liner which puts the lineman at a difference of potential and the hazard of electrical shock and or induction in hot corridors can result in a shock or burn. The development of the equipotential safety device fulfills this need.

SUMMARY OF THE INVENTION

To achieve the above and other objectives, the present invention provides for an equipotential device having, a grate having a corner, a grounding stud disposed on the corner of the grate, an attachment clamp securing a low-resistance connection to a bare overhead cable, a bonding cable having a first end and a second end, and a low resistance connection attaching the bonding cable first end to the grounding stud and the bonding cable second end to the attachment clamp.

The grate may be made of steel grating material. The grate may be 1 inch in height. The bonding cable may be made of copper stranded cable. The bonding cable may be 1/0 AWG in diameter. The bonding cable may be 12 ft. in length. The low resistance connection may be a bolted connection. The low resistance connection may be an exothermic connection. The equipotential device may be installed in a basket. The basket may be supported by a boom. The basket may include a grate installed at a bottom of the basket atop a dielectric liner. The bonding cable may run up an interior of the basket where it remains free for connection. The equipotential device may have an aerial lift vehicle adapted to be positioned to access an overhead power line.

The basket may be adapted to be positioned so that a lineman accesses the overhead power line, while the boom holds the basket in a static position. The overhead power line may generate a voltage on the specific conductor due to inductive coupling with respect to ground. The bonding cable may remain in a coiled state along with the attachment clamp in the bottom of the basket when not in use. The attachment clamp may be attached to a specific conductor for maintenance, testing, or repair. The equipotential device may be adapted to form an equipotential loop with respect to the specific conductor, the attachment clamp, the bonding cable, the grate, and the lineman to avoid possible shock or electrocution. The lineman may be adapted to touch the specific conductor and the voltage differential will be zero volts.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
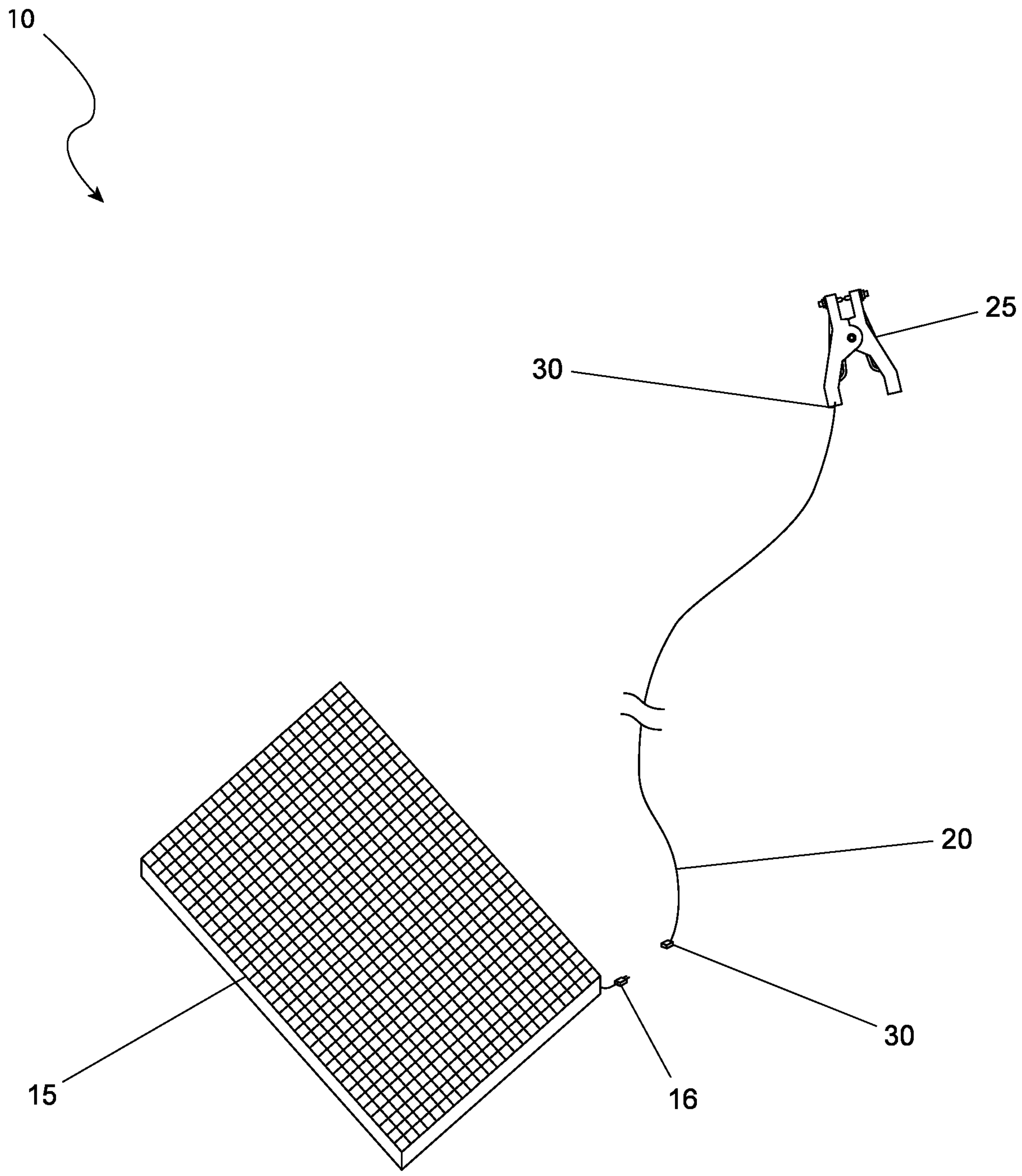
FIG. 1 is a pictorial view of the equipotential device for aerial vehicles, according to the preferred embodiment of the present invention.

10 equipotential device
15 grate
16 grounding stud
20 bonding cable
25 attachment clamp
30 low resistance connection
35 basket
40 boom
45 dielectric liner
50 aerial lift vehicle
55 overhead power line
60 specific conductor
65 lineman
70 personal protective equipment (PPE)
75 supporting structure
80 inductive coupling
85 equipotential loop

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a pictorial view of the equipotential device 10, according to the preferred embodiment of the present invention is disclosed. The equipotential device (herein also described as the "device") 10, allows electrical linemen 65 in an aerial lift vehicle 50 to more safely work on overhead de-energized electrical lines 55. A grate 15, envisioned to be made of steel grating material, would be made available in several sizes, each just slightly smaller that the bottom surface of a bucket used on an aerial lift. The grate 15 would be approximately one inch (1 in.) in height. One (1) corner of the grate 15 is provided with a grounding stud 16. A bonding cable 20, made of copper stranded cable and approximately 1/0 AWG in diameter (0.3249 inches), and approximately twelve feet (12 ft.) in length. However, other sizes of the bonding cable 20 with regard to diameter and length may also be used with the device 10, and as such, specific length and diameter parameters should not be interpreted as a limiting factor of the present invention. An attachment clamp 25 is provided at the distal end of the bonding cable 20. The attachment clamp 25 is used to secure a low-resistance connection to a bare overhead cable as will be shown herein below. A low resistance connection 30, such as a bolted connection, an exothermic connection, or the like is used to attach the bonding cable 20 to the grounding stud 16 and to the attachment clamp 25. It is noted that the bonding cable 20, the attachment clamp 25, and the low resistance grounding connection 39 is customarily provided by others, such as a contractor or utility contractor.

Figure 2:
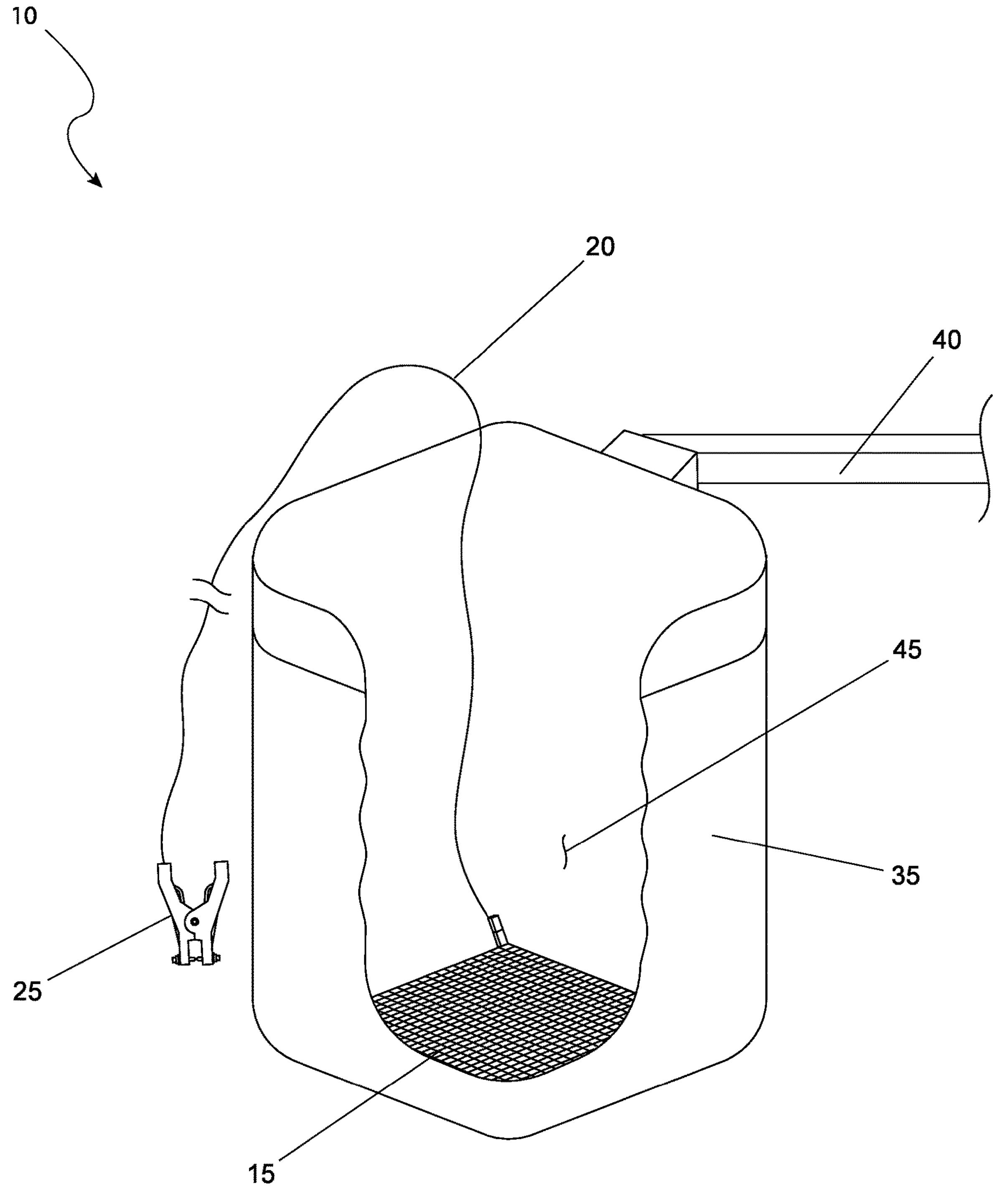
FIG. 2 is a cutaway view of the equipotential device, shown in an installed state in a basket, according to the preferred embodiment of the present invention.

Referring next to FIG. 2, a cutaway view of the device 10, shown in an installed state in a basket 35, according to the preferred embodiment of the present invention is depicted. The basket 35 is supported by a boom 40, here partially shown. The cutaway of the basket 35 depicts the grate 15 installed in the bottom of the basket 35 atop a dielectric liner 45, customarily supplied as part of the basket 35. The bonding cable 20 runs up on the interior of the basket 35 where it remains free for connection, as will be shown herein below. When not in use, the bonding cable 20 would remain in a coiled state along with the attachment clamp 25 in the bottom of the basket 35.

Figure 3:
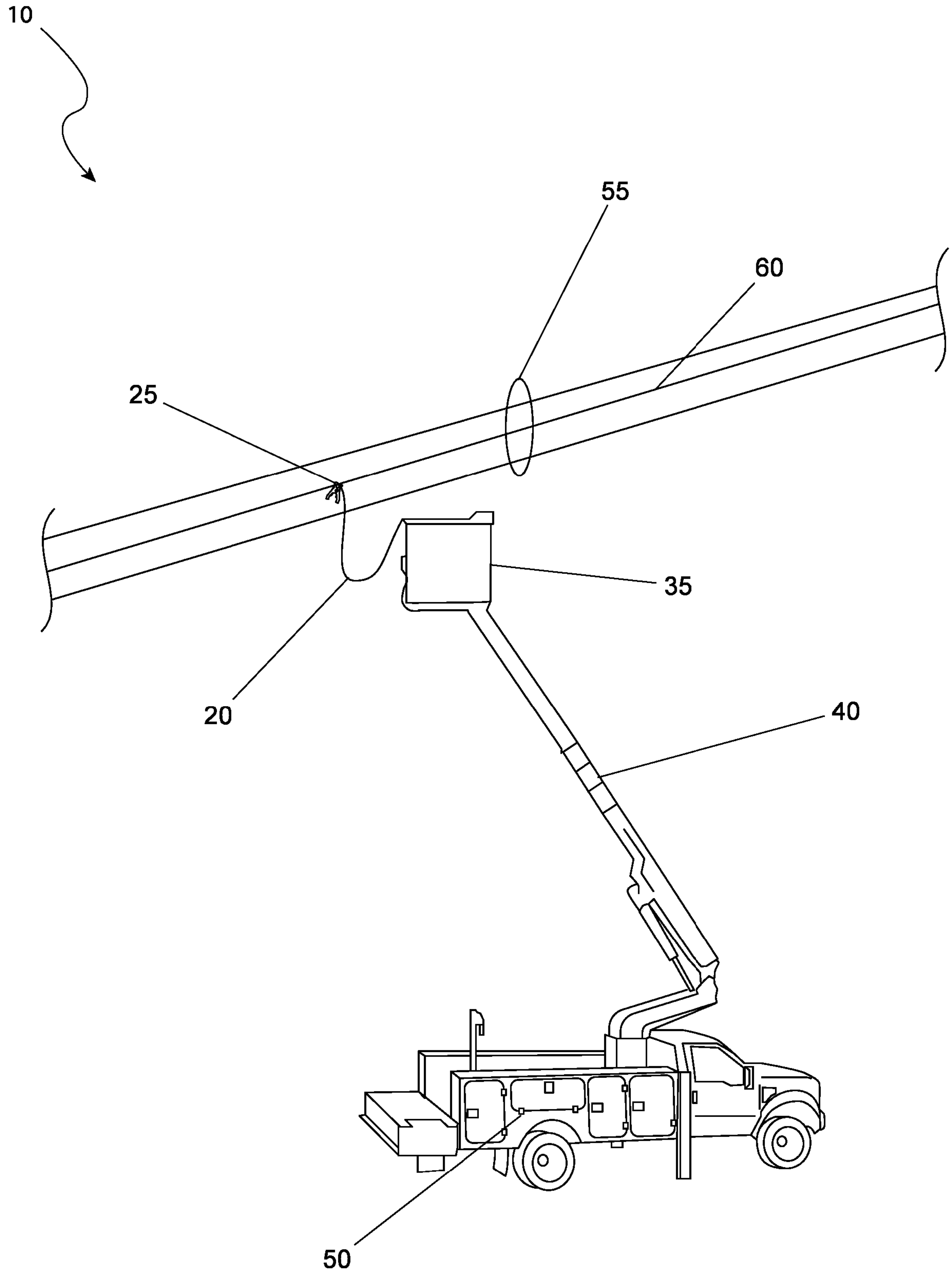
FIG. 3 is a pictorial view of the equipotential device, shown in a utilized state, according to the preferred embodiment of the present invention.

Referring now to FIG. 3, a pictorial view of the device 10, shown in a utilized state, according to the preferred embodiment of the present invention is shown. An aerial lift vehicle 50 is positioned to access an overhead power line 55. The exact type of aerial lift vehicle 50 and the configuration of the overhead power line 55 shown is not intended to be a limiting factor of the overhead power line 55. The basket 35 is positioned so that a lineman can access the overhead power line 55, while the boom 40 holds the basket 35 in a static position. The bonding cable 20 and the attachment clamp 25 is attached to a specific conductor 60 for purposes of maintenance, testing, repair, or the like.

Figure 4:
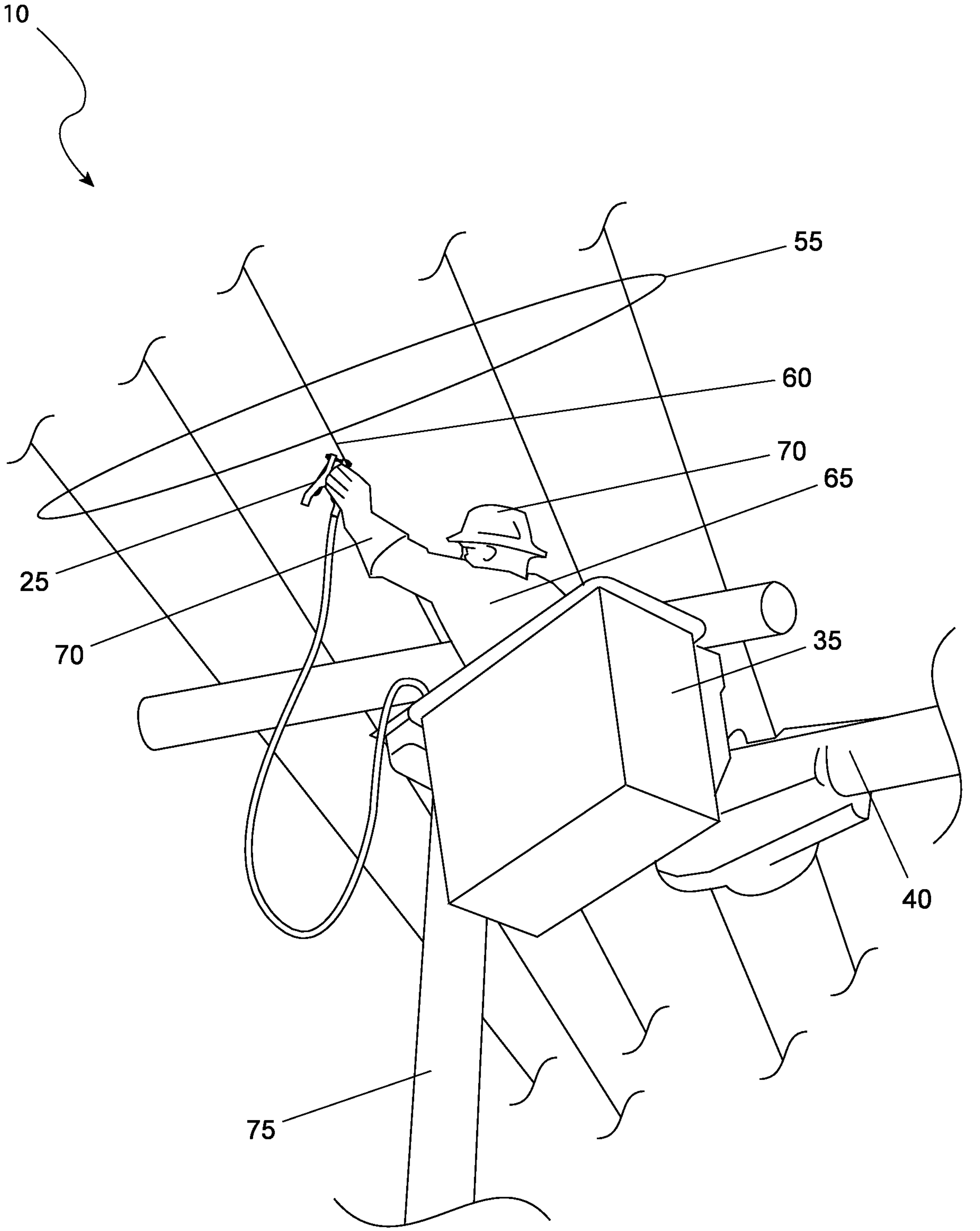
FIG. 4 is a close-up pictorial view of the equipotential device, shown in a utilized state, according to the preferred embodiment of the present invention.

Referring next to FIG. 4, a close-up pictorial view of the device 10, shown in a utilized state, according to the preferred embodiment of the present invention is disclosed. This view provides additional detail on the arrangement of the basket 35 with respect to the overhead power line 55 and usage of the device 10. A lineman 65 is positioned in the basket 35 with the grate 15 (as shown in FIGS. 1 and 2) installed in the bottom of the basket 35. The lineman 65 wearing personal protective equipment (PPE) 70, including, but not limited to: a hardhat, insulated gloves, eye protection, non-flammable clothing, and the like, attaches the attachment clamp 25 to the specific conductor 60. This action places the lineman 65 at the same electrical potential as the overhead power line 55 as will be described in greater detail herein below. The action of connecting the attachment clamp 25 will the first action performed upon the specific conductor 60, with the subsequent removal of the attachment clamp 25 being the last action performed. The work action performed by the lineman 65 may include work on supporting structures 75 such as wooden poles, steel structures and the like.

Figure 5:
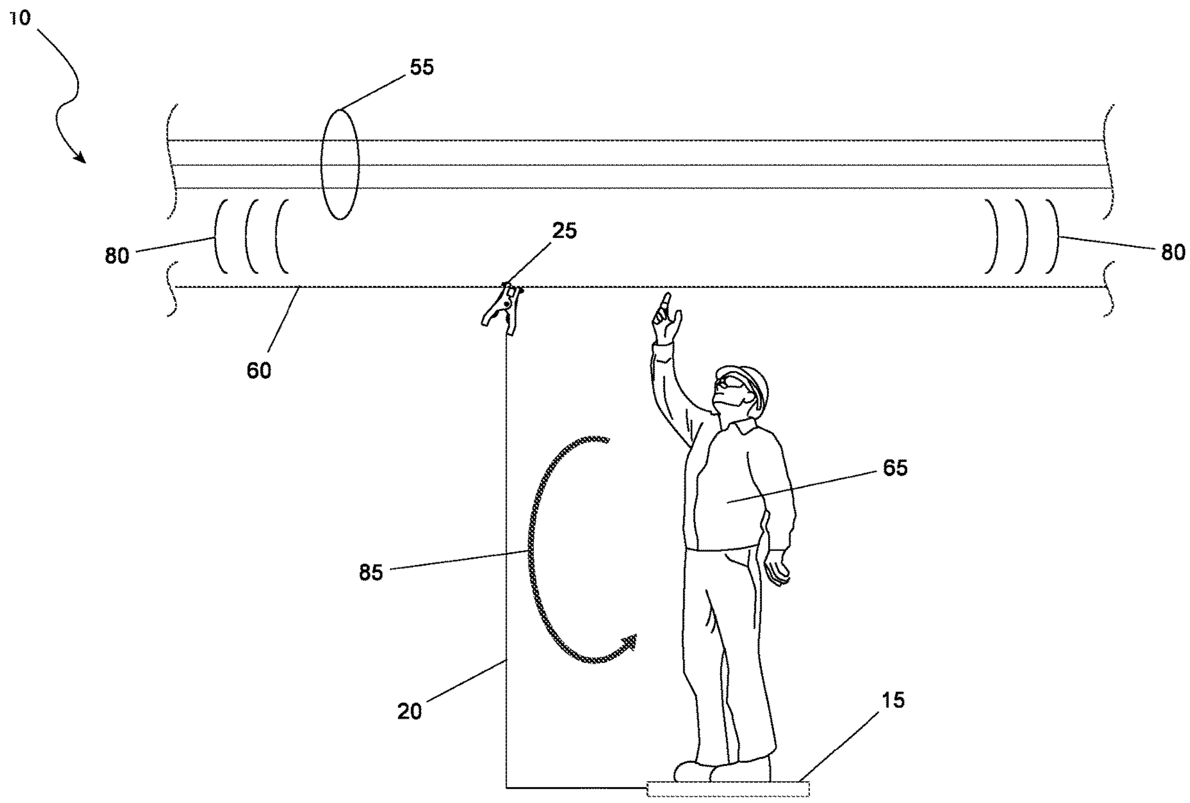
FIG. 5 is an electrical diagram of the equipotential device, according to the preferred embodiment of the present invention.

Referring finally to FIG. 5, an electrical diagram of the device 10, according to the preferred embodiment of the present invention is depicted. The overhead power line 55, envisioned to be operational during the usage of the device 10, may generate a voltage on the specific conductor 60 due to inductive coupling 80 with respect to ground. To avoid possible shock or electrocution, the device 10 forms an equipotential loop 85 with respect to the specific conductor 60, the attachment clamp 25, the bonding cable 20, the grate 15 and the lineman 65. Thus, as the lineman 65 touches the specific conductor 60 at any point, the voltage differential will be zero volts, (0.0 V).

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as electrical supply houses, specialty manufacturing houses, in house manufacturing facilities, mail order and internet supply houses and the like. Special attention would be paid to the overall dimensions of the grate 15 such that it fits within the confines of the bottom of the basket 35 in which it is intended to be used.

After procurement and prior to utilization, the device 10 would be prepared in the following manner: the grate 15 would be placed within the bottom of the basket 35 atop the dielectric liner 45; and the bonding cable 20 with the attachment clamp 25 on the distal end, would be routed outside of the basket 35. At this point in time, the device 10 is ready for usage.

During utilization of the device 10, the following procedure would be initiated: the specific conductor 60 amongst the overhead power line 55 would be de-energized; the aerial lift vehicle 50 would be positioned below the overhead power line 55 in a normal and conventional manner; the lineman 65 would enter the basket 35 and raise the boom 40 such that the lineman 65 can reach and access the specific conductor 60; any personal protective master grounds would be installed with hot line fiberglass stick tool using a shotgun; any other process specific safety requirements would be completed; and the lineman 65 would attach the attachment clamp 25 the specific conductor 60. As the lineman 65 is standing upon the grate 15, the lineman 65 is at the same potential as the specific conductor 60. Thus, even if a voltage is generated from adjacent overhead power line 55 (that remained energized) via inductive coupling 80, the lineman 65 remains at the same voltage potential. As the lineman 65 touches other sections of the specific conductor 60, no shock results as there is no voltage differential.

After work, such as maintenance, repair, inspection or the like is completed on the specific conductor 60, the lineman 65 removes the attachment clamp 25 as the last action before lowering the basket 35. The bonding cable 20 is then coiled within the bottom of the basket 35 where it is stored along with the attachment clamp 25 until needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An equipotential device comprising:

a grate configured to be positioned within a bottom of a basket of an aerial lift vehicle, the grate including a grounding stud disposed at a corner of the grate;

a dielectric liner positioned beneath the grate within the basket;

a bonding cable having a first end and a second end, the bonding cable comprising a copper stranded cable;

an attachment clamp connected to the second end of the bonding cable, the attachment clamp configured to secure a low-resistance connection to a specific conductor of an overhead power line; and, a low-resistance connection attaching the first end of the bonding cable to the grounding stud; and, wherein, when the attachment clamp is connected to the specific conductor, the grate, the bonding cable, the attachment clamp, and a lineman standing within the basket form an equipotential loop with respect to the specific conductor to reduce a voltage differential to approximately zero volts.

2. The equipotential device of claim 1, wherein the bonding cable has a diameter of approximately 1/0 AWG and a length of approximately twelve feet.

* * * * *